(12) United States Patent
Dhammawat et al.

(10) Patent No.: US 12,355,662 B2
(45) Date of Patent: *Jul. 8, 2025

(54) PACKET FLOW MANAGEMENT FOR QUALITY OF SERVICE (QoS) FLOWS IN A PRIVATE 5G NETWORK

(71) Applicant: Cisco Technology, Inc., San Jose, CA (US)

(72) Inventors: Abhishek Dhammawat, San Jose, CA (US); Srinath Gundavelli, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 58 days.

This patent is subject to a terminal disclaimer.

(21) Appl. No.: 18/362,282

(22) Filed: Jul. 31, 2023

(65) Prior Publication Data

US 2023/0412497 A1    Dec. 21, 2023

Related U.S. Application Data

(63) Continuation of application No. 17/332,264, filed on May 27, 2021, now Pat. No. 11,811,652.

(51) Int. Cl.
*H04L 45/00* (2022.01)
*H04L 45/302* (2022.01)
(Continued)

(52) U.S. Cl.
CPC ............ *H04L 45/38* (2013.01); *H04L 45/302* (2013.01); *H04L 45/566* (2013.01);
(Continued)

(58) Field of Classification Search
CPC ..... H04L 45/38; H04L 45/302; H04L 45/566; H04L 47/2441; H04L 67/147; H04W 28/0268
See application file for complete search history.

(56) References Cited

U.S. PATENT DOCUMENTS 8,194,698 B2    6/2012    Senthilnathan et al.
8,339,954 B2    12/2012    Dahod
(Continued)

FOREIGN PATENT DOCUMENTS

| WO | 2018145103 A1 | 8/2018 |
|---|---|---|
| WO | 2022019044 A1 | 1/2022 |
| WO | 2022133006 A1 | 6/2022 |

OTHER PUBLICATIONS

Cisco: "5G SMF Overview," downloaded Sep. 23, 2020, 16 Pages.
(Continued)

*Primary Examiner* — G. C. Neurauter, Jr.
(74) *Attorney, Agent, or Firm* — Edell, Shapiro & Finnan, LLC

(57) ABSTRACT

A user plane function (UPF) node may receive a packet for traffic associated with a user equipment (UE). During packet classification, the UPF node may identify that a packet filter for the packet is not found in a packet filter set of an existing Quality of Service (QoS) Flow. In response, the UPF node may configure the packet filter in the packet filter set of the QoS Flow based on a flow tuple of the packet. The UPF node may send, to a control plane function node, a message which indicates a request for adding the flow tuple to the QoS Flow. The message may be for triggering communication of a message which indicates a session modification command for receipt by the UE, for adding an uplink packet filter that is based on the flow tuple for the QoS Flow.

20 Claims, 14 Drawing Sheets

(51) Int. Cl.
  *H04L 47/2441* (2022.01)
  *H04L 67/147* (2022.01)
  *H04W 28/02* (2009.01)

(52) U.S. Cl.
  CPC ........ *H04L 47/2441* (2013.01); *H04L 67/147* (2013.01); *H04W 28/0268* (2013.01)

(56) References Cited

U.S. PATENT DOCUMENTS

| | | |
|---|---|---|
| 8,817,618 B2 | 8/2014 | Dahod |
| 10,785,674 B2 | 9/2020 | Cakulev et al. |
| 10,980,084 B2 | 4/2021 | Dao et al. |
| 11,811,652 B2 * | 11/2023 | Dhammawat ......... H04L 45/566 |
| 2011/0170411 A1 | 7/2011 | Wang et al. |
| 2014/0056130 A1 | 2/2014 | Grayson et al. |
| 2018/0184340 A1 | 6/2018 | Pularikkal et al. |
| 2019/0116518 A1 | 4/2019 | Stojanovski et al. |
| 2020/0112874 A1 | 4/2020 | Jheng et al. |
| 2020/0128430 A1 | 4/2020 | Yi et al. |
| 2020/0128503 A1 | 4/2020 | Li et al. |
| 2020/0221361 A1 | 7/2020 | Bae et al. |
| 2020/0245163 A1 | 7/2020 | Jaya et al. |
| 2020/0351702 A1 | 11/2020 | Stojanovski et al. |
| 2020/0351984 A1 | 11/2020 | Talebi Fard et al. |
| 2021/0014742 A1 | 1/2021 | Wang et al. |
| 2021/0105687 A1 | 4/2021 | Prabhakar et al. |
| 2022/0104062 A1 | 3/2022 | Aijaz |
| 2022/0182321 A1 | 6/2022 | Landais et al. |

OTHER PUBLICATIONS

Cisco: "Ultra Cloud Core 5G User Plane Function, Release Jan. 2021—Configuration and Administration Guide," Cisco Systems, Inc., Apr. 10, 2021, 244 Pages.

Liveaction: "Cisco QoS Handbook," 2nd Edition, downloaded from Internet, Sep. 15, 2020, 58 Pages.

* cited by examiner

FIG. 2A 130

| DNN | Example Services | Business Intent |
|---|---|---|
| Internet | SIP, RTP | enterprise relevant |
| Internet | Telepresence, Webex, Jabber, Facetime, Whatsapp | enterprise relevant |
| Internet | youtube | enterprise irrelevant |

| 5QI | Type Of Service | Resource Type | Default Priority Level | Packet Delay Budget | Category Of Services | Application ID / Name |
|---|---|---|---|---|---|---|
| 1 | Voice | GBR | 20 | 100 ms | Conversational voice | SIP, RTP |
| 2 | Conversational Video | GBR | 40 | 150ms | Conversational Video | Telepresence, Webex, Jabber, Facetime, Whatsapp |
| 6 | Buffered Video | Non GBR | 60 | 300ms | Video (Buffered Streaming) | Youtube |

| 5QI | QoS Policy | Application ID / Name |
|---|---|---|
| 1 | QoS Policy 1 | ID 1 |
| 2 | QoS Policy 2 | ID 2 |
| 6 | QoS Policy 3 | ID 3 |

200C

New PFCP Flow tuple add request message

| Information Elements |
|---|
| QFI |
| PDR ID |
| Protocol |
| Source Port |
| Destination Port |
| Source Address |
| Destination Address |

FIG. 8

New PFCP Flow tuple add response message

| Information Elements |
|---|
| Cause |
| Offending IE |

FIG. 9

New PFCP Flow tuple remove request message

| Information Elements |
|---|
| QFI |
| PDR ID |
| Protocol |
| Source Port |
| Destination Port |
| Source Address |
| Destination Address |

FIG. 13

New PFCP Flow tuple remove response message

| Information Elements |
|---|
| Cause |
| Offending IE |

FIG. 14

PACKET FLOW MANAGEMENT FOR QUALITY OF SERVICE (QoS) FLOWS IN A PRIVATE 5G NETWORK

CROSS REFERENCE TO RELATED APPLICATIONS

This application is a continuation of U.S. App. Ser. No. 17/332,264, filed May 27, 2021, now U.S. Pat. No. 11,811,652, the entirety of which is incorporated herein by reference.

TECHNICAL FIELD

The present disclosure relates to telecommunications, and in particular, to techniques and mechanisms for packet flow management for established Quality of Service (QoS) flows in a mobile network, such as an enterprise private Third Generation Partnership Project (3GPP) network.

BACKGROUND

An enterprise network deployment may be or include a Fifth Generation (5G) network for "private 5G." In such enterprise deployments that involve mission-critical devices, Internet of Things (IoT) devices, and robotics, key considerations are reliability, low-latency, and application-specific Quality of Service (QoS) treatment.

Private 5G adopts the concept of a QoS Flow from the basic 5G System (5GS) architecture defined in Third Generation Partnership Project (3GPP) standards. QoS Flows start at a User Plane Function (UPF) and extend to a gNodeB (gNB), and are mapped to radio bearers/QoS Flows at the gNB. Sessions of the UPF are managed by a Session Management Function (SMF) over an N4 interface using a Packet Forwarding Control Protocol (PFCP).

A QoS Flow represents a particular QoS classification and treatment on an application or Internet Protocol (IP) flow basis. A 5G QoS Identifier (5QI) is used to identify a specific QoS forwarding behavior for a QoS Flow (similar to a QoS Class Identifier "QCI" in an Long-Term Evolution "LTE" network). A QoS Flow may be associated with a Guaranteed Bit Rate (GBR), a Guaranteed Flow Bit Rate (GFBR), a Maximum Bit Rate (MBR), or a Packet Delay Budget (PDB), as examples. A GBR or GFBR bearer guarantees that a specific minimum bit rate is always available on that bearer.

For 5G communications, the bandwidth requirement is typically quite large. At the core network or UPF, system resources may be very limited. There are GBR QoS Flows in 5G that require high bandwidth, low latency and high throughput. Such types of resources are limited in a private 5G network. For example, an enterprise system may only be able to provide GBRs for two-hundred (200) active QoS flows at given time; how many active sessions/QoS flows are present at a given instant will depend on the actual deployment model.

As is apparent, many types of radio bearers/QoS flows may be considered to be premium resources and, accordingly, they should be monitored and utilized wisely. Overload or congestion in the network may result in undesirable packet drops and QoS degradation. In some cases, the UPF may be unable to guarantee the GBR, GFBR, or PDB for QoS Flows due to such congestion and overload.

To monitor and utilize resources wisely, the UPF may actively manage and monitor QoS Flows to keep active only those QoS Flows which have traffic activity, deleting QoS Flows that are detected to have traffic inactivity and re-creating QoS Flows having newly-detected activity. These techniques for creating or re-creating a QoS Flow include the identification and use of a single 5-tuple packet filter according to the first detected packet. However, a QoS Flow may be used for many different IP traffic streams associated with multiple different 5-tuples. These different IP traffic streams may be associated with the same or different applications. The procedures for active management of QoS Flows would need further consideration for classifying traffic associated with any or all different IP traffic streams associated with the same QoS Flow.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A is a table for representing a mapping of associations between applications, data networks, and business intents of the private 5G network, which may be provided from a network controller to the control plane function of the private 5G network;

FIG. 2B is a table for representing a mapping of associations between a plurality of application identifiers (IDs)/names associated with applications and a plurality of 5G Quality of Service (QoS) Identifiers (5QIs) associated with QoS policies;

FIG. 2C is a more simplified table for representing a mapping of associations between a plurality of application IDs/names associated with applications and a plurality of 5QIs associated with QoS policies;

FIG. 8 is a table having a list of information elements (IEs) which may be utilized in a message which indicates a request for adding a flow tuple to an existing QoS Flow for the methods described in relation to FIGS. 5-7 according to some implementations;

FIG. 9 is a table having a list of IEs which may be utilized in a message which indicates a response to the request for adding a flow tuple from an existing QoS Flow for the methods described in relation to FIGS. 5-7 according to some implementations;

FIG. 13 is a table having a list of IEs which may be utilized in a message which indicates a request for removing a flow tuple to an existing QoS Flow for the methods described in relation to FIGS. 10-12 according to some implementations;

FIG. 14 is a table having a list of IEs which may be utilized in a message which indicates a response to the request for removing a flow tuple from an existing QoS Flow for the methods described in relation to FIGS. 10-12 according to some implementations.

DESCRIPTION OF EXAMPLE EMBODIMENTS

Figure 1A:
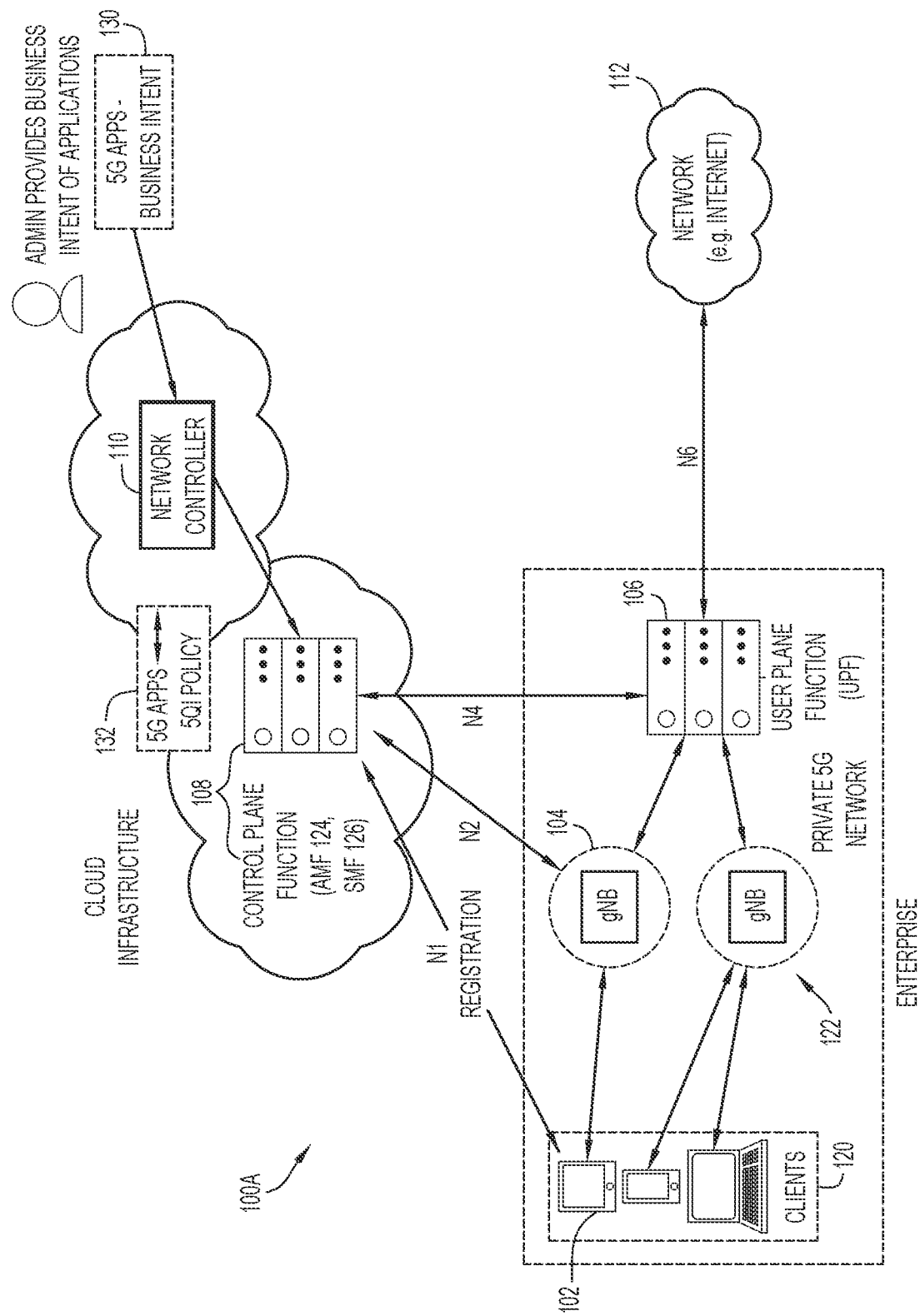
FIG. 1A is an illustrative representation of a basic network architecture of an enterprise private Third Generation Partnership Project (3GPP) network, which is (more specifically) a private Fifth Generation (5G) network, which may include a user plane function (UFP) and a control plane function which may be or include a session management function (SMF)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.
Overview
Techniques and mechanisms for packet flow management for existing Quality of Service (QoS) Flows in a mobile network are described herein. The mobile network may be or include a Third Generation Partnership Project (3GPP) mobile network, such as a 3GPP Fifth Generation (5G) network or an enterprise private 3GPP 5G network.

In one illustrative example, a packet flow and filter may be added to an existing QoS Flow according to some implementations of the present disclosure. A user plane function node (e.g. having a user plane function or "UPF") may receive a packet for traffic associated with a user equipment (UE). The user plane function node may identify that a packet filter for the packet is not found in a packet filter set of an existing QoS Flow. Based on the identifying, the user plane function node may configure the packet filter in the packet filter set of the existing QoS Flow based on a flow tuple of the packet. The packet filter based on the flow tuple may be utilized for packet classification of a packet flow associated with the UE. In addition, the user plane function node may send, to a control plane function node, a message which indicates a request for adding the flow tuple to the existing QoS Flow. The message may be used for triggering communication of a message which indicates a session modification command for receipt by the UE, for adding an uplink packet filter that is based on the flow tuple for the existing QoS Flow. The message which indicate the request may include the flow tuple of the packet associated with the packet flow, a QoS Flow Identifier (QFI) of the existing QoS Flow, and a Packet Detection Rule (PDR) ID of a PDR associated with the packet filter set. The user plane function node may receive, from the control plane function node, a message which indicates a response to the request for adding the flow tuple to the existing QoS Flow.

In some implementations, if the packet filter for the packet is not found in the packet filter set, but the user plane function node identifies that packet classification for the packet is based on an access control list (ACL) or a Differentiated Services Control Point (DSCP) (e.g. for traditional enterprise QoS/policy control), then the user plane function node may refrain from performing the steps of configuring and sending the message which indicates the request.

In a corresponding method to the above-described method, a control plane function node (e.g. having an SMF, or both an SMF and an AMF) may receive, from a user plane function node (e.g. having a UPF), a message which indicates a request for adding a flow tuple to an existing QoS Flow for traffic associated with a UE. This request may be received in response to the user plane function node identifying that a packet filter for a detected packet is not found in a packet filter set of an existing QoS Flow. The message may indicate the flow tuple of the detected packet of a packet flow, a QFI of the existing QoS Flow, and a PDR ID of a PDR associated with the packet filter set. Based on receiving the message which indicates the request, the control plane function node may communicate a message which indicates a session modification command for receipt by the UE, for adding an uplink packet filter that is based on the flow tuple for the existing QoS Flow. The control plane function node may send, from the user plane function node, a message which indicates a response to the request for adding the flow tuple to the existing QoS Flow.

In another illustrative example, a packet flow and filter may be removed from an existing QoS Flow according to some implementations of the present disclosure. A user plane function node (e.g. having a UPF) may identify that a limit on a number of packet filters of a packet filter set of the existing QoS Flow has been reached. Alternatively, the user plane function node may identify that a measured time period of traffic inactivity for a packet flow of the existing QoS Flow has been reached. Based on the identifying, the user plane function node may remove a packet filter in the packet filter set of the existing QoS Flow, where the packet filter is based on a flow tuple and utilized for packet classification of the packet flow. The user plane function node may send, to a control plane function node (e.g. having an SMF, or both an SMF and an AMF, a message which indicates a request for removing the flow tuple from the existing QoS Flow. The message may be used for triggering communication of a message which indicates a session modification command for receipt by the UE, for removal of an uplink packet filter that is based on the flow tuple of the existing QoS Flow. The message which indicates the request may include the flow tuple of the packet associated with the packet flow, a QFI of the existing QoS Flow, and a PDR ID of a PDR associated with the packet filter set. The user plane function node may receive, from the control plane function node, a message which indicates a response to the request for removing the flow tuple from the existing QoS Flow.

In a corresponding method to the above-described method, a control plane function node (e.g. having the SMF, or both the SMF and the AMF) may receive, from a user plane function node (e.g. having the UPF), a message which indicates a request for removing a flow tuple from the existing QoS Flow. This request may be received in response to the user plane function node identifying that a limit on a number of packet filters of the packet filter set of the existing QoS Flow has been reached. Alternatively, this request may be received in response to identifying that a measured time period of traffic inactivity for a packet flow of the existing QoS Flow has been reached. The message may indicate the flow tuple associated with a packet flow, the QFI of the existing QoS Flow, and a PDR ID of a PDR associated with a packet filter set of the existing QoS Flow. Based on receiving the message which indicates the request, the control plane function node may communicate a message which indicates a session modification command for receipt by the UE, for removal of an uplink packet filter that is based on the flow tuple for the existing QoS Flow. The control plane function node may send, to the user plane function node, a message which indicates a response to the request for removing the flow tuple from the existing QoS Flow.

More detailed and alternative techniques and implementations are provided herein as described below.

EXAMPLE EMBODIMENTS

As described earlier in the Background section, an enterprise network deployment may be or include a Third Generation Partnership Project (3GPP) defined Fifth Generation (5G) network for "private 5G." In such enterprise deployments that involve mission-critical devices, Internet of Things (IoT) devices, and robotics, key considerations are reliability, low-latency, and application-specific Quality of Service (QoS) treatment.

To illustrate, FIG. 1A is an illustrative representation of a network architecture 100A of an enterprise private 3GPP network for an enterprise, which is, more specifically, a private network. Relatedly, FIG. 1B shows a network architecture 100B of the private 5G network of FIG. 1A as a simplified, schematic block diagram.

Figure 1B:
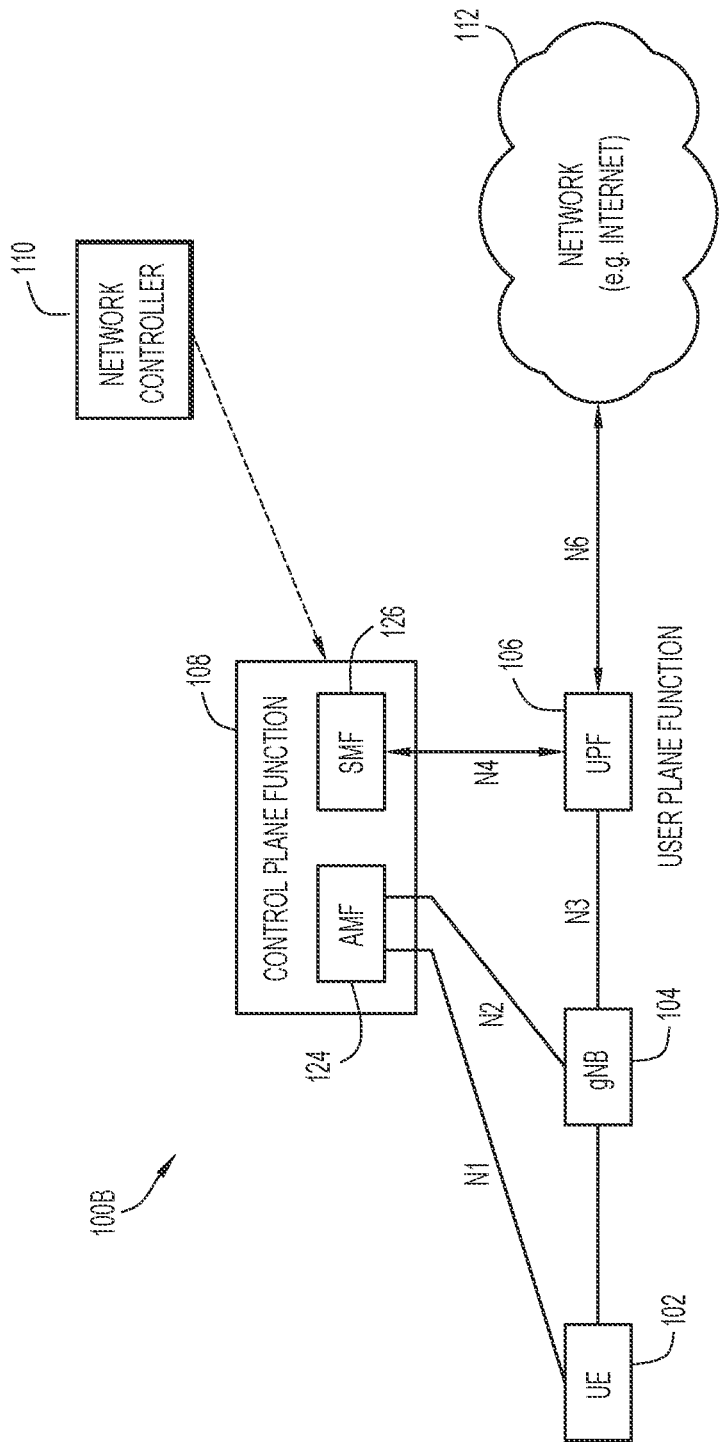
FIG. 1B shows the network architecture of the private 5G network of FIG. 1A as a simplified, schematic block diagram.

The private 5G network may utilize the network architecture 100A/100B in FIGS. 1A-1B to facilitate communications for a plurality of clients 120 or user equipment (UEs) 102. UE 102 may be any suitable type of device, such as a cellular telephone, a smart phone, a tablet device, an IoT device, a Machine-to-Machine (M2M) device, a robotics device, and a sensor, to name but a few.

UE 102 may obtain access to the private 5G network via a radio access network (RAN) which may have one or more base stations or gNodeBs (gNB s) 122, such as a gNB 104. A user plane function (UPF) 106 may be used to carry traffic for an application for UE 102. For example, UPF 106 may carry uplink (UL) and downlink (DL) traffic between UE 102 operating in the private 5G network and a network 112, such as the Internet.

A control plane function(s) 108 of a control plane may be utilized in the private 5G network for access and mobility management, session management, and/or policy management and control, etc., for UEs. In particular, control plane function 108 may include an Access and Mobility Management Function (AMF) 124 and a Session Management Function (SMF) 126, as well as other 3GPP 5G System (5GS) defined functions (some or all of which may be enabled). AMF 124 and SMF 126 (as well as other 5GS-defined functions) may be implemented as separate functions or components, or alternatively provided together as an integrated functionality (in whole or in part) and/or co-located at the same node or component. A session at UPF 106 may be managed by SMF 126 over an N4 interface using a Packet Forwarding Control Protocol (PFCP). In some implementations, control plane function 108 is provided locally in the private 5G network. In other implementations, control plane function 108 is provided as part of a cloud infrastructure.

Operation, functionality, and protocols utilized in the private 5G network may at least generally conform to 3GPP standards for 5G (e.g. 3GPP Technical Specifications or "TS" 23.501 and 23.502), except where adapted and described herein according to the present disclosure. A plurality of interfaces and/or reference points N1, N2, N3, N4, and N6 shown in FIGS. 1A-1B (and others) may represent the communications and/or protocols between each of the entities, as is known by the relevant (evolving) standards documents.

A network controller 110 may also be provided for managing the private 5G network. More particularly, network controller 110 may be provided in the private 5G network for managing and controlling policy and configuration in the private 5G network. In some implementations, network controller 110 is provided locally in the private 5G network. In other implementations, network controller 110 is provided as part of a cloud infrastructure. In one example, the cloud infrastructure having network controller 110 may be referred to as a cloud manager or a management cloud.

In some implementations, network controller 110 in the cloud infrastructure is operative to provide management and control over policy and configuration according to intent-based networking. The motivation of intent-based networking is to enable a user to describe in plain language what he or she wants to accomplish (e.g. the user's intent) and have the network translate the user's objective into configuration and policy changes that are automatically propagated across a heterogeneous computing environment. An intent-based network operates to abstract network complexity, automate much of the work of provisioning and managing the network typically handled by a network administrator, and assure secure operation and optimal performance of the network. In some implementations, network controller 110 in the cloud infrastructure may be or include a Cisco Digital Network Architecture (Cisco DNA™).

Private 5G adopts the concept of a QoS Flow from the standard 5GS architecture. A QoS Flow starts at UPF 106 and extends to gNB 104, where it is mapped to a radio bearer/QoS Flow to UE 102. Each QoS Flow is associated with a particular QoS classification and treatment on an Internet Protocol (IP) or application flow basis. A 5G QoS Identifier (5QI) is used to identify a specific QoS forwarding behavior for a QoS Flow. A QoS Flow may be associated with a Guaranteed Bit Rate (GBR), a Guaranteed Flow Bit Rate (GFBR), a Maximum Bit Rate (MBR), or a Packet Delay Budget (PDB), as examples. A GBR or GFBR bearer guarantees that a specific minimum bit rate is always available on that bearer.

For 5G communications, the bandwidth requirement is typically quite large. There are GBR QoS Flows in 5G that require high bandwidth, low latency and high throughput. Such GBR-type QoS Flows and associated radio bearers may be considered to be premium resources, especially in a limited private network. Unfortunately, congestion or overload in the network may result in undesirable packet drops and QoS degradation. In some cases, UPF 106 may be unable to guarantee the GBR, GFBR or PDB for QoS Flows due to congestion and overload.

To explain further, each private 5G network or system of an enterprise may have its own system level capacity. Consider a system where a data rate requirement per QoS Flow is 100 megabits per second (MBPS) and an overall system limit is 20 gigabits per second (GBPS). In this case, the system can provide GBRs for two-hundred (200) active QoS Flows at a given time. However, the number of active sessions/QoS Flows present at a given instant will depend on the deployment model. Admission control at the SMF is unable to solve the present issues, as there are clients that require a high bandwidth and, if limitations are configured according to admission control, the system may have scaling challenges. In one example environment, the system level capacity may be 64,000 (64K) where two-hundred (200) active sessions may be present at a given time, but the number can always be exceeded if the number of active sessions/QoS Flows exceeds the estimate.

According to some implementations, techniques and mechanisms of the present disclosure may be provided together with or built upon existing procedures for QoS resource management, for example, a "UPF-triggered QoS Flow creation procedure" and/or a "UPF-triggered QoS Flow deletion procedure" for optimizing use of QoS resources in a mobile network. In these procedures, a UPF may keep an active monitoring of QoS Flows (e.g. those associated with one of a GBR, GFBR, or PDB), keeping active only those QoS Flows which have traffic activity, and deleting QoS Flows that are detected to have traffic inactivity. For example, the UPF may determine that a measured time period of traffic inactivity for a dedicated QoS Flow is outside a limit set by a time period threshold, and send to the SMF a request for deleting the dedicated QoS Flow based on the determining. When traffic is again received for an application for a UE for which no current dedicated QoS flow exists, the UPF may send a request for creating a dedicated QoS Flow for the traffic with the appropriate QoS.

What may be utilized in the above-mentioned procedures is a mapping of stored associations between a plurality of application identifiers (IDs) and/or names of applications (e.g. "5G applications") and 5QIs and/or corresponding QoS profiles (as well as other relevant information, if and as needed). This mapping may be stored at and/or used by the control plane function (e.g. the SMF). To that end, with reference back to FIGS. 1A, it is illustrated that information for 5G applications may be input to (e.g. by a network administrator) and sent from network controller 110 to control plane function 108 for use with the private 5G network. The information may include a mapping 130 of stored associations between applications, data networks, and business intents of the private 5G network. Control plane function 108 may obtain the information that includes mapping 130, and use this information to build or generate a mapping 132 of stored associations between a plurality of application IDs/names associated with the applications and a plurality of 5QIs associated with QoS profiles.

To better illustrate and explain, FIG. 2A is a table 200A for representing the mapping 130 of stored associations between applications, data networks, and business intents of the private 5G network. Mapping 130 may be provided from network controller 110 to control plane function 108 for use with the private 5G network (see FIG. 1A). In this example, mapping 130 may associate applications for various services with Data Network Names (DNN) and particular intents. As indicated, the various example services associated with the applications may include Session Initiation Protocol (SIP), Real-time Transfer Protocol (RTP), Telepresence, WebEx, Jabber, Facetime, WhatsApp, and YouTube. The business intents may include whether or not the service is enterprise relevant or enterprise irrelevant.

FIG. 2B is a table 200B for representing the mapping 132 of stored associations between a plurality of application IDs/names associated with the applications and a plurality of 5QIs (as well as additional information). Each one of the plurality of 5QIs may be associated with a respective one of a plurality of different QoS profiles. Mapping 132 of table 200B in FIG. 2B may be stored at control plane function 108 for use with the private 5G network (see FIG. 1A). In FIG. 2B, each entry for an application ID/name (e.g. SIP, RTP, Telepresence, WebEx, Jabber, Facetime, WhatsApp, or YouTube) may be associated with a unique 5QI and correspondingly a unique QoS profile, associated with a type of service (e.g. voice, conversational video, or buffered video), a resource type (e.g. GBR or non-GBR), a default priority level (e.g. 20, 40, or 60), a PDB (e.g. 100 ms, 150 ms, or 300 ms), and a category of service (conversational voice, conversational video, or video—buffered streaming).

FIG. 2C is a more simplified table 200C for representing the mapping 132 of stored associations between a plurality of application IDs/names (e.g. ID 1, ID 2, and ID 3 etc.) associated with applications and a plurality of 5QIs (e.g. 1, 2, 6, etc.) associated with the QoS profiles. Mapping 132 in table 200C of FIG. 2C may be stored at control plane function 108 for use with the private 5G network (see FIG. 1A). Again, each of the plurality of 5QIs (e.g. 1, 2, 6, etc.) may be associated with a respective one of a plurality of different QoS profiles (e.g. QoS profile 1, QoS profile 2, QoS profile 3, etc.).

Each QoS profile and flow may be associated with a QoS Flow Identifier (QFI). A QoS profile may be or include a plurality of QoS parameters: a 5QI; an Allocation and Retention Priority (ARP); for each Non-GBR QoS Flow, a Reflective QoS Attribute (RQA); for each GBR QoS Flow, a GFBR (for UL and DL), and a Maximum Flow Bit Rate (MFBR) (for UL and DL); in the case of a GBR QoS Flow, a notification control, and a Maximum Packet Loss Rate (for UL and DL).

As mentioned above, in some implementations, techniques and mechanisms of the present disclosure may be provided together with or built upon existing procedures for QoS resource management, for example, a "UPF-triggered QoS Flow creation procedure" and/or a "UPF-triggered QoS Flow deletion procedure" for optimizing use of QoS resources in a mobile network. These procedures are now described in relation to FIG. 3 (i.e. a UPF-triggered QoS Flow creation procedure) and FIG. 4 (i.e. a UPF-triggered QoS Flow deletion procedure).

Figure 3:
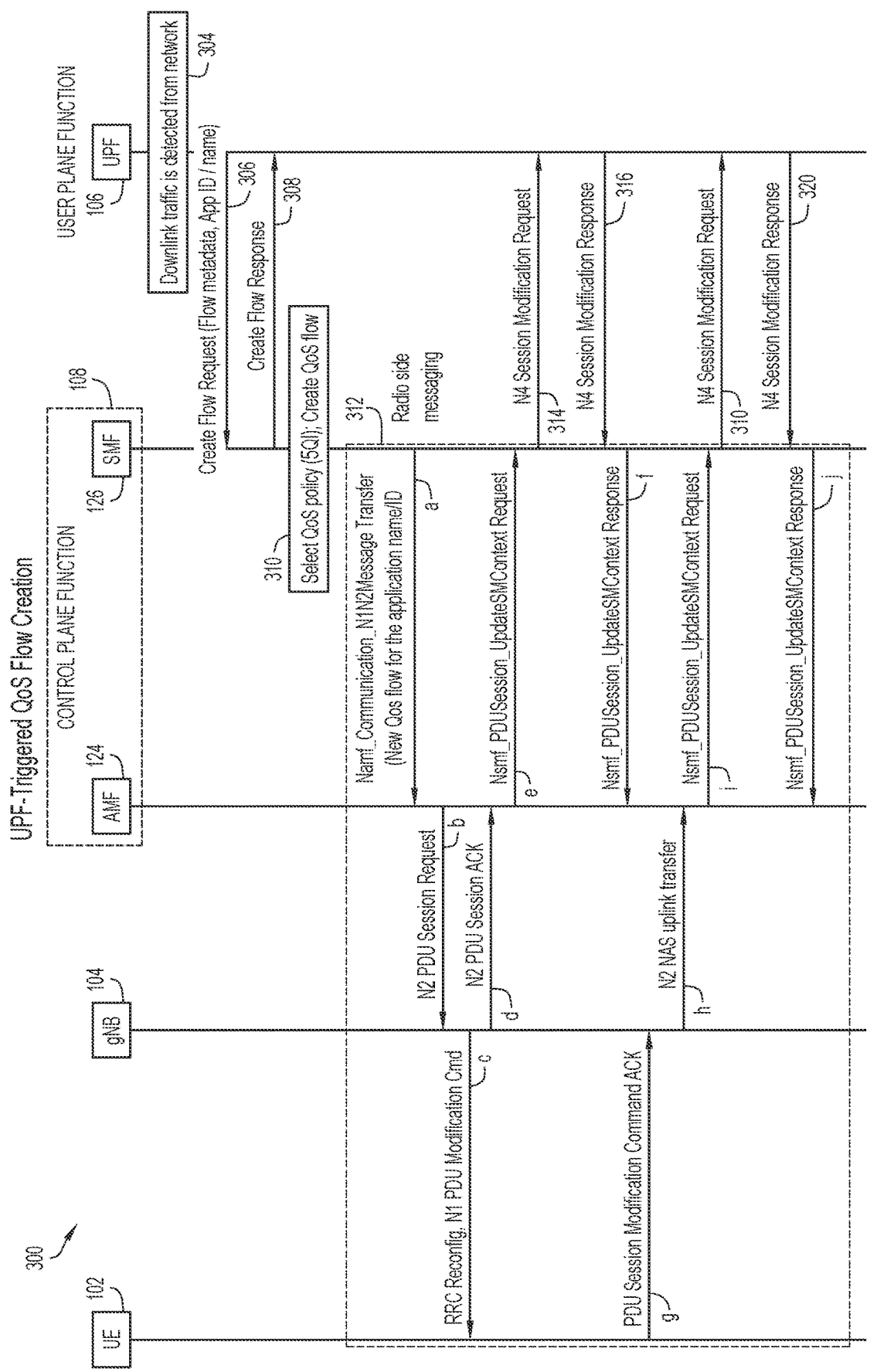
FIG. 3 is a call flow diagram for describing a call flow for QoS resource management for optimizing use of QoS resources in a mobile network (e.g. with use of a UPF-triggered QoS Flow creation procedure), which involve techniques upon which packet flow management of the present disclosure may be built upon.

FIG. 3 is a call flow diagram 300 for describing a call flow for QoS resource management for optimizing use of QoS resources in a mobile network (e.g. the enterprise private 3GPP based network of FIGS. 1A-1B) according to some implementations of the present disclosure. In some implementations, the call flow of FIG. 3 may be and/or be referred to as a UPF-triggered QoS Flow creation procedure.

In general, UPF 106 operates to forward traffic for applications for UEs operating in a mobile network. Initially, however, no current dedicated QoS Flow is established for traffic for an application for a particular UE (i.e. UE 102) which operates in the mobile network. Sometime during operation, UPF 106 may detect traffic for the application for UE 102 for which no current dedicated QoS Flow is established (step 304 of FIG. 3). Again, such detection of traffic may be (e.g. only) for those applications that SMF 126 configures or provisions at UPF 106 (e.g. pre-configured application identifiers for enterprise-aware or approved applications). UPF 106 may forward this (e.g. initial or startup) traffic in a default QoS Flow of UE 102 (e.g. a previously-established default QoS Flow). In response to the detection of the traffic, UPF 106 may send, to SMF 126, a message which indicates a request for creating a dedicated QoS Flow for traffic for the application for UE 102 (step 306 of FIG. 3). The message may include flow metadata (e.g. n-tuple flow metadata) and an application identifier obtained in detecting the initial traffic. The detection at UPF 106 may involve the use of DPI or the like. SMF 126 may receive this message and send, to UPF 106, a message which indicates a response to creating the dedicated QoS Flow (step 308 of FIG. 3). In some implementations, the message of this step may merely serve as an acknowledgement to the message.

Then, a new dedicated QoS Flow may be created for the traffic for the application for UE 102, which may be based on a selected QoS policy associated with the application identifier. For creating the dedicated QoS Flow, SMF 126 may select one of a plurality of QoS policies based on the application identifier (step 310 of FIG. 3). The selected QoS policy may be associated with one of a plurality of different 5QIs. In some implementations, SMF 126 may select the QoS policy based on the application identifier by consulting the mapping which is stored in memory. SMF 126 may perform radio-side messaging for creating the dedicated QoS Flow, sending one or more radio-side messages for creating the dedicated QoS Flow (step 312 of FIG. 3), which extends to UE 102 via a base station (e.g. gNB 104) to UPF 106. The one or more messages may include an SDF filter for UE 102, which may be generated based on the flow metadata (e.g. n-tuple flow metadata) and the application identifier.

The radio-side messaging for QoS Flow creation of step 312 is described now in more detail. SMF 126 may initiate a Namf_Communication_N1N2Message Transfer towards AMF 124 (step "a" of FIG. 3). The message transfer may include a PDU Session Modification Command, and for example, the QFI and QoS profile for the new dedicated QoS Flow. AMF 124 may send to SMF 126 an acknowledgement data notification (not shown in FIG. 3). AMF 124 may then send an N2 PDU Session Request message to gNB 104 (step "b" of FIG. 3). This message may include an N1 Session Management (SM) container which carries the PDU Session Modification Command. The gNB 104 may issue a signaling exchange with UE 102 that is related with the information received from SMF 126. Here, an RRC Connection Reconfiguration may take place with UE 102 (e.g. transporting the N1 SM container to UE 102) for modifying resources related to the PDU session (step "c" of FIG. 3). The gNB 104 may acknowledge the N2 PDU Session Request by sending an N2 PDU Session Ack message to AMF 124 (step "d" of FIG. 3). AMF 124 may forward the N2 SM information to SMF 126 via an Nsmf_PDUSession_UpdateSMContext service operation (step "e" of FIG. 3). SMF 126 may reply with an Nsmf_PDUSession_UpdateSMContext Response (step "f" of FIG. 3).

With respect to UPF 106, SMF 126 may update the N4 session of UPF 106 by sending an N4 Session Modification Request (step 314 of FIG. 3). This may be for configuring one or more rules of the selected QoS policy at UPF 106 for the dedicated QoS Flow. For example, SMF 126 may update UPF 106 with one or more UL PDRs for the new dedicated QoS Flow. This may allow UL packets with the QFI of the new QoS Flow to be communicated. UPF 106 may reply with an N4 Session Modification Response (step 316 of FIG. 3).

Continuing with the radio-side messaging after step "f", UE 102 may acknowledge the PDU Session Modification Command from step "c" by sending a NAS message to gNB 104 (step "g" of FIG. 3), which forwards the NAS message to AMF 124 (step "h" of FIG. 3). AMF 124 forwards the N1 SM container (e.g. including the PDU Session Modification Command Ack) to SMF 126 via an Nsmf_PDUSession_UpdateSMContext service operation (step "i" of FIG. 3). SMF 126 may reply with a Nsmf_PDUSession_UpdateSMContext Response (step "j" of FIG. 3).

With respect to UPF 106, SMF 126 may again update the N4 session of UPF 106 by sending an N4 Session Modification Request (step 318 of FIG. 3). UPF 106 may reply with an N4 Session Modification Response (step 320 of FIG. 3).

Figure 4:
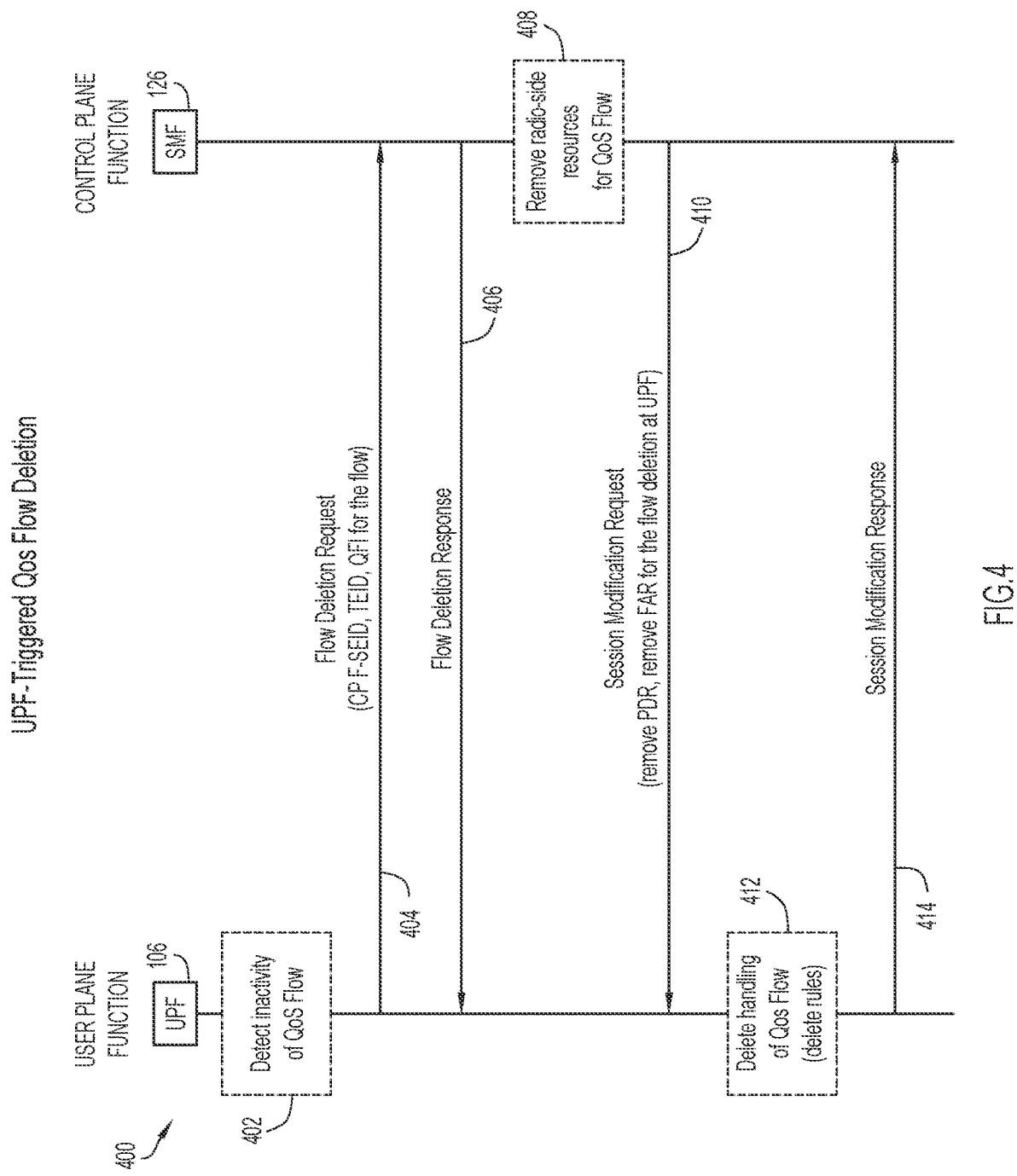
FIG. 4 is a call flow diagram for describing a call flow for QoS resource management for optimizing use of QoS resources in a mobile network (e.g. with use of a UPF-triggered QoS Flow deletion procedure), which involve techniques upon which packet flow management of the present disclosure may be built upon.

FIG. 4 is a call flow diagram 400 for describing a call flow for QoS resource management for optimizing use of QoS resources in a mobile network (e.g. the enterprise private 3GPP based network of FIGS. 1A-1B) according to some implementations of the present disclosure. In some implementations, the call flow of FIG. 4 may be and/or be referred to as a UPF-triggered QoS Flow deletion procedure.

Initially, UPF 106 may operate to forward traffic for an application for a UE in a dedicated QoS Flow. The dedicated QoS Flow may be associated with at least one of a GBR, a GFBR, or a PDB. UPF 106 may monitor traffic activity/inactivity in the dedicated QoS Flow. Based on the monitoring, UPF 106 may determine that a measured time period of (continuous) traffic inactivity for the dedicated QoS Flow is outside a limit set by a time period threshold (step 402 of FIG. 4). In response to determining, UPF 106 may send, to SMF 126 based on the determining, a message which indicates a request for deleting the dedicated QoS Flow (step 404 of FIG. 4). The message may include information associated with the dedicated QoS Flow for deletion. In some implementations, the information associated with the dedicated QoS Flow may include at least one of a QFI, a CP F-SEID, or a TEID associated with the dedicated QoS Flow. In response to receiving the message of step 404, UPF 106 may receive, from SMF 126, a message which indicates a response to the deleting of the dedicated QoS Flow (step 406 of FIG. 4). In some implementations, the message of step 406 may merely serve as an acknowledgement to the message of step 404.

In response to the message of step 404, SMF 126 may send one or more radio-side messages for deleting the QoS Flow (step 408 of FIG. 4). In some implementations, this procedure or its steps may involve a standard procedure for deletion of a QoS Flow. UPF 106 may then receive, from SMF 126, a message which indicates a session modification request for deleting the dedicated QoS Flow (step 410 of FIG. 4). Again, SMF 126 may issue this request based on the information received in relation the request for deletion. UPF 106 may then remove the dedicated QoS Flow, which includes deleting the one or more rules for the dedicated QoS Flow (step 412 of FIG. 4). For example, the one or more rules to be removed or deleted may include the PDR and/or the FAR. UPF 106 may send, to SMF 126, a message which indicates a session modification response (step 414 of FIG. 4).

With respect to the above procedures in FIGS. 3 and 4, the procedure for QoS Flow creation (i.e. the procedure of FIG. 3) includes the identification and use of a single 5-tuple packet filter according to an initial or first detected packet. However, a QoS Flow may be used for many different IP traffic streams associated with multiple different 5-tuples (e.g. multiple IP traffic streams associated with the same application, or even different applications).

Accordingly, what are needed are techniques and mechanisms for packet flow management for existing QoS flows, which may provide for packet flow and filter addition to an existing QoS Flow, as well as packet flow and filter removal from an existing QoS Flow.

Figure 5:
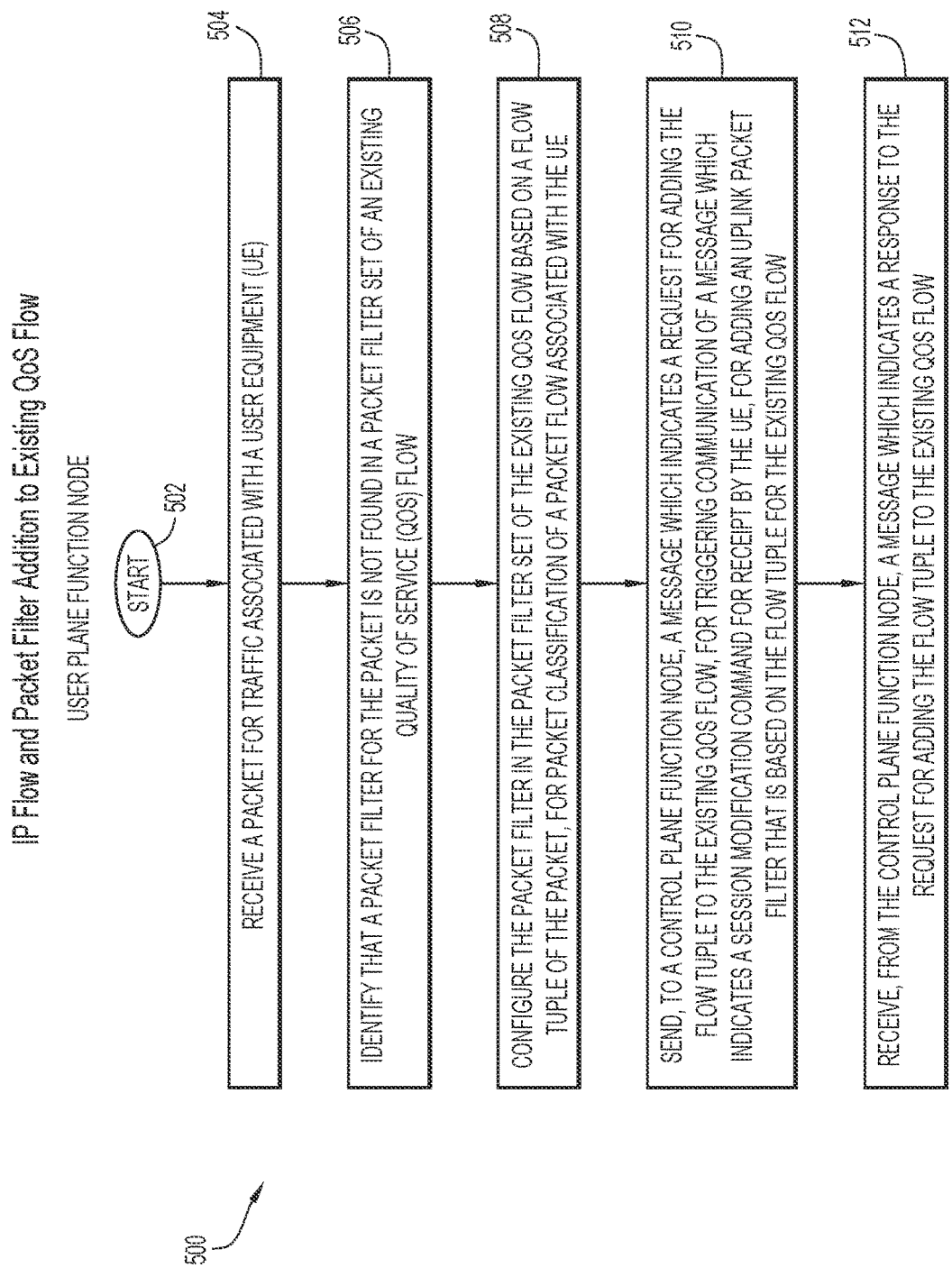
FIG. 5 is a flowchart for describing a method of packet flow management for existing QoS Flows in a mobile network, which includes a packet flow and filter addition to an existing QoS Flow according to some implementations of the present disclosure, which may be performed by a user plane function node of the mobile network.

FIG. 5 is a flowchart 500 for describing a method of packet flow management for existing QoS Flows in a mobile network, such as an enterprise private 5G network, according to some implementations of the present disclosure. In particular, the method of FIG. 5 involves a packet flow and filter addition to an existing QoS Flow according to some implementations. The method of FIG. 5 may be performed by a user plane function node for use in a mobile network. More particularly, the method of FIG. 5 may be performed by a network node or computing device configured to connect in a network for communication, to operate a user plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a user plane function, a UPF, or other similar function.

Beginning at a start block 502 of FIG. 5, the user plane function node may receive a packet for traffic associated with a UE (step 504 of FIG. 5). The user plane function node may identify that a packet filter for the packet is not found in a packet filter set of an existing QoS Flow (step 506 of FIG. 5). Based on the identifying, the user plane function node may configure the packet filter in the packet filter set of the existing QoS Flow based on a flow tuple of the packet (step 508 of FIG. 5). The packet filter based on the flow tuple may be utilized for packet classification of a packet flow associated with the UE. In some implementations, the flow tuple may be an IP tuple or 5-tuple for an IP flow. In addition, the user plane function node may send, to a control plane function node, a message which indicates a request for adding the flow tuple to the existing QoS Flow (step 510 of FIG. 5). The message may be used for triggering communication of a message which indicates a session modification command for receipt by the UE, for adding an uplink packet filter that is based on the flow tuple for the existing QoS Flow. The message which indicate the request may include the flow tuple of the packet of the packet flow, a QFI of the existing QoS Flow, and a PDR ID of a PDR associated with the packet filter set. The user plane function node may receive, from the control plane function node, a message which indicates a response to the request for adding the flow tuple to the existing QoS Flow (step 512 of FIG. 5).

In some implementations of step 506, as an alternative to or addition to when the packet filter for the packet is not found in the packet filter set in step 506, if the user plane function node identifies that packet classification for the packet is based on an access control list (ACL) or a Differentiated Services Control Point (DSCP) (e.g. for traditional enterprise QoS/policy control), then the user plane function node may refrain from performing steps 508, 510, and 512.

In step 510, where the control plane function node has an SMF (e.g. for use in a public 5G network), the control plane function node may communicate the message which indicates the session modification command by sending, towards an AMF and to the UE, a message which indicates an N1N2 message transfer, and which includes the message which indicates the session modification command for adding the uplink packet filter that is based on the flow tuple for the existing QoS Flow. Alternatively in step 510, where the control plane function node has both an SMF and an AMF (e.g. for use in an enterprise private 5G network), the control plane function node may communicate the message which indicates the session modification command by sending, towards a RAN to the UE, a message which indicates the session modification command for adding the uplink packet filter that is based on the flow tuple for the existing QoS Flow.

Figure 6:
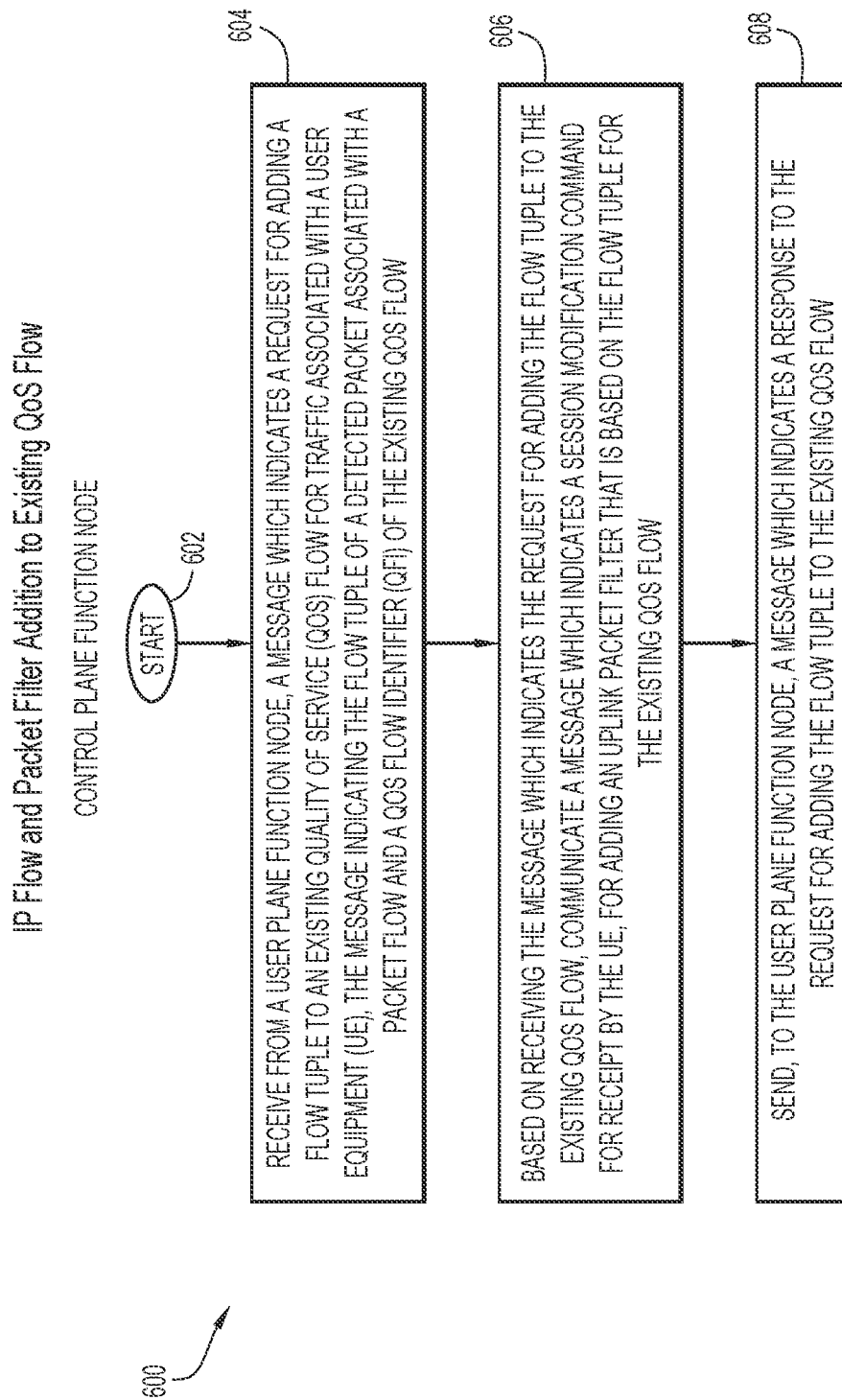
FIG. 6 is a flowchart for describing a method of packet flow management for existing QoS Flows in a mobile network, which includes a packet flow and filter addition to an existing QoS Flow according to some implementations of the present disclosure, which may be performed by a control plane function node of the mobile network.

FIG. 6 is a flowchart 600 for describing a method of packet flow management for existing QoS Flows in a mobile network, such as an enterprise private 5G network, according to some implementations of the present disclosure. In particular, the method of FIG. 6 involves a packet flow and filter addition to an existing QoS Flow according to some implementations. The method of FIG. 6 may be performed by a control plane function node for use in a mobile network, and is a corresponding method to the method of FIG. 5 involving the user plane function node. More particularly, the method of FIG. 6 may be performed by a network node or computing device configured to connect in a network for communication, to operate a control plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a control plane function, an SMF, an SMF plus AMF, or other similar function(s).

Beginning at a start block 602 of FIG. 6, the control plane function node may receive, from a user plane function node, a message which indicates a request for adding a flow tuple to an existing QoS Flow for traffic associated with a UE (step 604 of FIG. 6). This request may be received in response to the user plane function node identifying that a packet filter for a detected packet is not found in a packet filter set of an existing QoS Flow. In some implementations, the flow tuple is an IP tuple or 5-tuple for an IP flow. The message may indicate the flow tuple of the detected packet associated with a packet flow, a QFI of the existing QoS Flow, and a PDR ID of a PDR associated with the packet filter set. Based on receiving the message which indicates the request, the control plane function node may communicate a message which indicates a session modification command for receipt by the UE (step 606 of FIG. 6), for adding an uplink packet filter that is based on the flow tuple for the existing QoS Flow. The control plane function node may send, to the user plane function node, a message which indicates a response to the request for adding the flow tuple to the existing QoS Flow (step 608 of FIG. 6).

In step 604, where the control plane function node has an SMF for use in the mobile network (e.g. for use in a public 5G network), the control plane function node may communicate the message which indicates the session modification command for receipt by the UE by sending, towards the AMF and to the UE, a message which indicates an N1N2 message transfer, and which includes the message which indicates the session modification command for adding the uplink packet filter that is based on the flow tuple for the existing QoS Flow. Alternatively in step 604, where the control plane function node has both an SMF and AMF (e.g. for use in an enterprise private 5G network), the control plane function node may communicate the message which indicates the session modification command for receipt by the UE by sending, towards a RAN (e.g. gNB) to the UE, a message which indicates the session modification command for adding the uplink packet filter that is based on the flow tuple for the existing QoS Flow.

Figure 7:
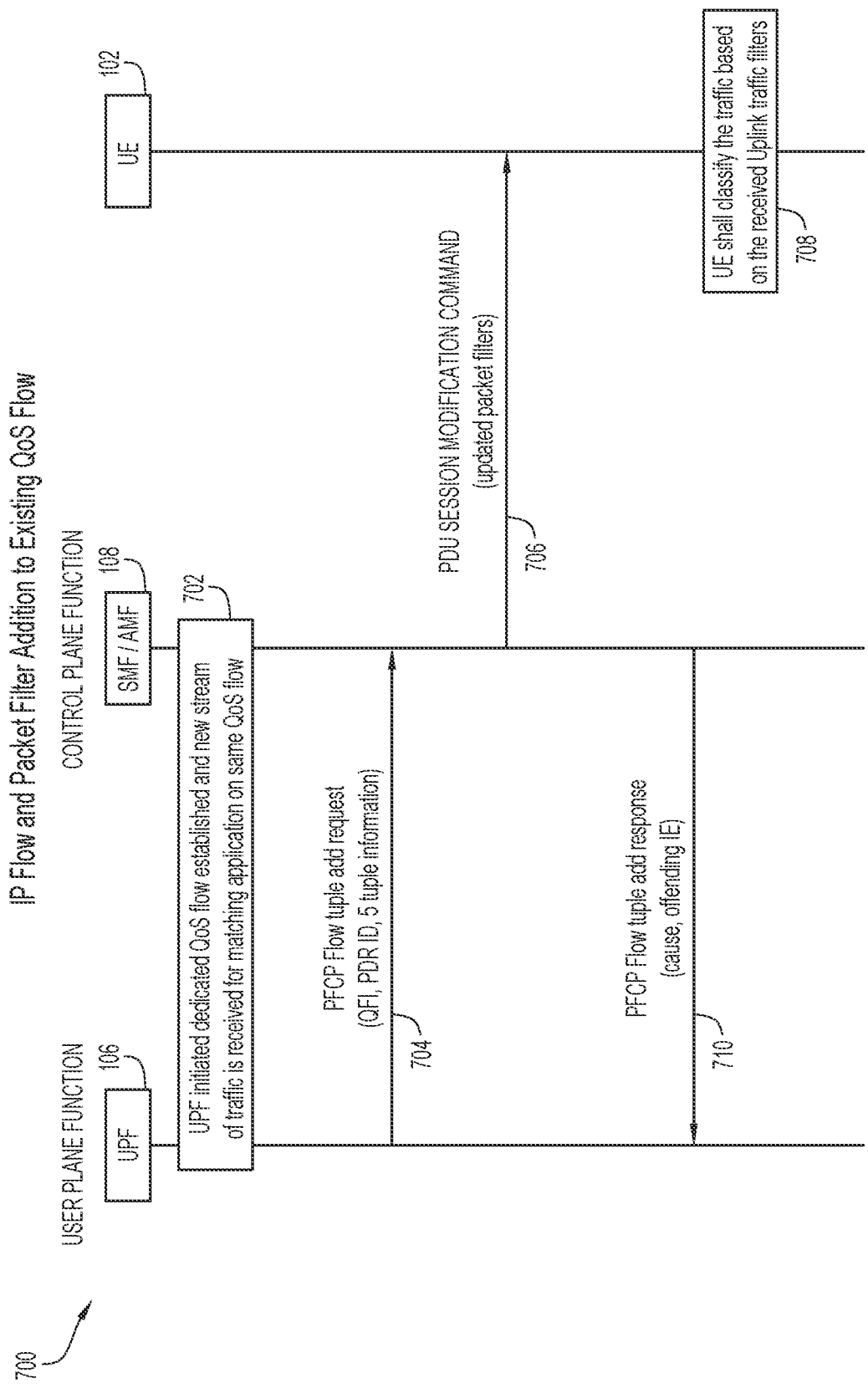
FIG. 7 is a call flow diagram for describing a call flow for packet flow management for existing QoS Flows in a mobile network, including a packet flow and filter addition to an existing QoS Flow according to some implementations of the present disclosure.

FIG. 7 is a call flow diagram 700 for describing a call flow for packet flow management for existing QoS Flows in a mobile network. In particular, the call flow of FIG. 7 involves a packet flow and filter addition to an existing QoS Flow according to some implementations. The call flow of FIG. 7 may be in accord with the methods of FIGS. 5-6.

In FIG. 7, a dedicated QoS Flow may be established at UPF 106. In some implementations, the dedicated QoS Flow may be established with use of the techniques described in relation to FIG. 3 (i.e. a "UPF-triggered QoS Flow creation procedure"). Here, a packet filter associated with a single flow tuple may be utilized for packet classification of the single packet flow in the QoS Flow. Subsequently, UPF 106 may receive a "new" stream of traffic for a matching application on the existing QoS Flow (step 702 of FIG. 7). Here, UPF 106 may identify that a packet filter for the packet is not found in a packet filter set of the existing QoS Flow. Based on the identifying, the user plane function node may configure the packet filter in the packet filter set of the existing QoS Flow based on a flow tuple of the packet. The packet filter based on the flow tuple may be utilized for packet classification of a packet flow associated with the UE. In some implementations, the flow tuple is an IP tuple or 5-tuple for an IP flow. In addition, UPF 106 may send, to control plane function 108, a message which indicates a request for adding the flow tuple to the existing QoS Flow (step 704 of FIG. 7). The message which indicates the request may include the flow tuple of the detected packet, a QFI of the existing QoS Flow, a PDR ID of a PDR associated with the packet filter set. The message may be used for triggering communication of a message which indicates a session modification command for receipt by UE 102 (step 706 of FIG. 7), for adding an uplink packet filter that is based on the flow tuple for the existing QoS Flow. In response to receipt of the message, UE 102 may configure the uplink packet filter for packet classification (step 708 of FIG. 7). UPF 106 may receive, from the control plane function, a message which indicates a response to the request for adding the flow tuple to the existing QoS Flow (step 710 of FIG. 7). In some implementations of step 702, (even) if the packet filter for the packet is not found in the packet filter set in step 702, and UPF 106 identifies that packet classification for the packet is based on an ACL or a DSCP (e.g. for traditional enterprise QoS/policy control), then UPF 106 may refrain from performing and triggering the above steps and processing (i.e. refrain from steps 508, 510, and 512).

In step 706, where control plane function 108 has both an SMF and an AMF (e.g. for use in an enterprise private 5G network), control plane function 108 may communicate the message which indicates the session modification command by sending, towards a RAN (e.g. gNB) to the UE 102, a message which indicates the session modification command for adding the uplink packet filter that is based on the flow tuple for the existing QoS Flow. Alternatively in step 706, where control plane function 108 has an SMF (e.g. without AMF functionality) (e.g. for use in a public 5G network), control plane function 108 may communicate the message which indicates the session modification command by sending, towards an AMF and to the UE 102, a message which indicates an N1N2 message transfer, and which includes the message which indicates the session modification command for adding the uplink packet filter that is based on the flow tuple for the existing QoS Flow. In some implementations, radio-side messaging that may be used to achieve the above processing may be similar to radio-side messaging 312 as described in relation to FIG. 3.

FIG. 8 is a table 800 having a list of IEs which may be utilized in a message which indicates a request for adding a flow tuple to an existing QoS Flow for the methods described in relation to FIGS. 5-7 according to some implementations. As shown in table 800, the IEs may include (at least some of) the QFI of the existing QoS Flow, the PDR ID of the PDR associated with the packet filter set, a protocol type, a source port, a destination port, a source address, and a destination address. In addition, FIG. 9 is a table 900 having a list of IEs which may be utilized in a message which indicates a response to the request for adding a flow tuple from an existing QoS Flow for the methods described in relation to FIGS. 5-7 according to some implementations. As shown in table 900, the IEs may include a cause and an offending IE (e.g. for indicating any issues in syntax, coding).

Figure 10:
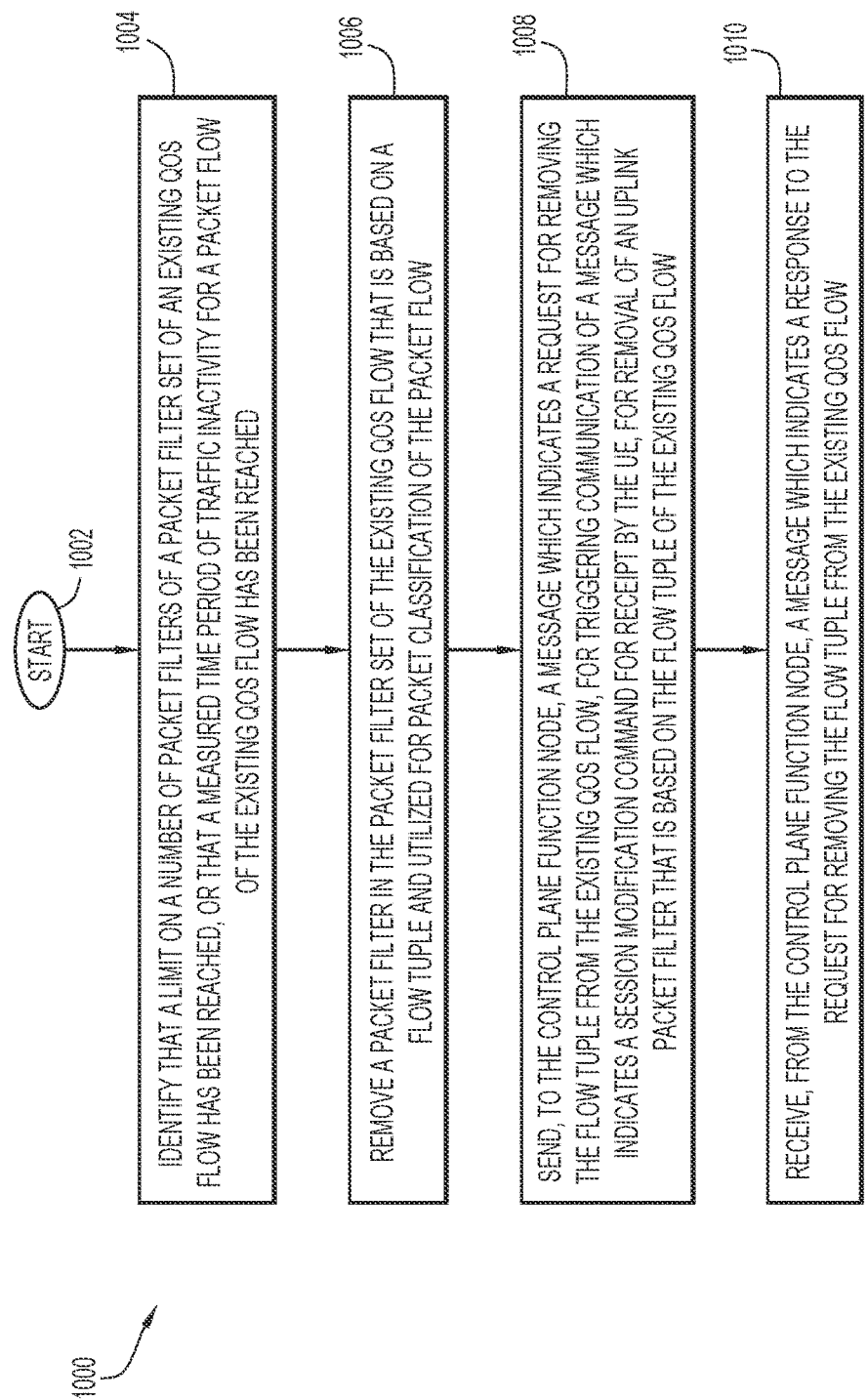
FIG. 10 is a flowchart for describing a method of packet flow management for existing QoS Flows in a mobile network, including a packet flow and filter removal from an existing QoS Flow according to some implementations of the present disclosure, which may be performed by a user plane function node of the mobile network.

FIG. 10 is a flowchart 1000 for describing a method of packet flow management for existing QoS Flows in a mobile network, such as an enterprise private 5G network, according to some implementations of the present disclosure. In particular, the method of FIG. 10 involves a packet flow and filter removal to an existing QoS Flow according to some implementations. The method of FIG. 10 may be performed by a user plane function node for use in a mobile network. More particularly, the method of FIG. 10 may be performed by a network node or computing device configured to connect in a network for communication, to operate a user plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a user plane function, a UPF, or other similar function.

Initially in FIG. 10, a dedicated QoS Flow may be established. In some implementations, this QoS Flow may be established with use of the techniques described in relation to FIG. 3 (i.e. the UPF-triggered QoS Flow creation procedure), where a plurality of packet filters associated with a plurality of flow tuples may be configured for packet classification for multiple packet flows of the QoS Flow with use of the techniques described in relation to FIGS. 5-9.

Beginning at a start block 1002 of FIG. 10, the user plane function node may identify that a limit on a number of packet filters of a packet filter set of the existing QoS Flow has been reached (step 1004 of FIG. 10). The limit may be identified when the user plane function node receives a "new" stream of traffic for a matching application on the existing QoS Flow. Alternatively, the user plane function node may identify that a measured time period of traffic inactivity for a packet flow of the existing QoS Flow has been reached (alternative step 1004 of FIG. 10). Based on the identifying, the user plane function node may remove a packet filter in the packet filter set of the existing QoS Flow that is based on a flow tuple and utilized for packet classification of the packet flow (step 1006 of FIG. 10). In some implementations, the packet filter that is selected for removal may be one that is identified to be inactive or least active relative to most or all other packet filters/flows. In some implementations, the flow tuple is an IP tuple or 5-tuple for an IP flow. The user plane function node may send, to the control plane function node, a message which indicates a request for removing the flow tuple from the existing QoS Flow (step 1008 of FIG. 10). The message may be for triggering communication of a message which indicates a session modification command for receipt by the UE, for removal of an uplink packet filter that is based on the flow tuple of the existing QoS Flow. The message which indicates the request may include the flow tuple of the packet flow, a QFI of the existing QoS Flow, and a PDR ID of a PDR associated with the packet filter set. The user plane function node may receive, from the control plane function node, a message which indicates a response to the request for removing the flow tuple from the existing QoS Flow (step 1010 of FIG. 10).

Figure 11:
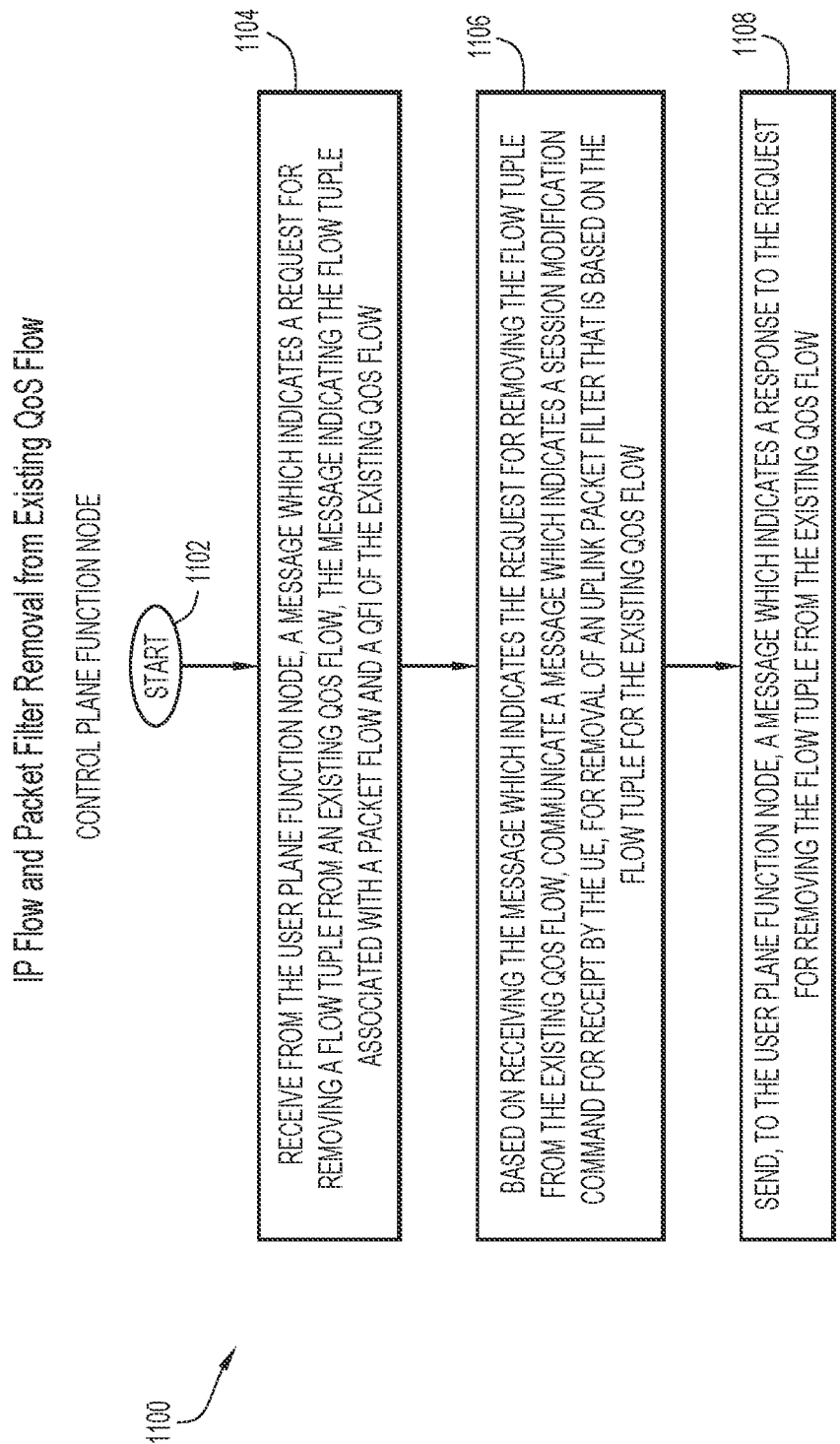
FIG. 11 is a flowchart for describing a method of packet flow management for existing QoS Flows in a mobile network, including a packet flow and filter removal from an existing QoS Flow according to some implementations of the present disclosure, which may be performed by a control plane function node of the mobile network.

FIG. 11 is a flowchart 1100 for describing a method of packet flow management for existing QoS Flows in a mobile network, such as an enterprise private 5G network, according to some implementations of the present disclosure. In particular, the method of FIG. 11 involves a packet flow and filter removal from an existing QoS Flow according to some implementations. The method of FIG. 11 may be performed by a control plane function node for use in a mobile network, and is a corresponding method to the method of FIG. 10 involving the user plane function node. More particularly, the method of FIG. 11 may be performed by a network node or computing device configured to connect in a network for communication, to operate a control plane function. In some implementations, the computing device or network node may include at least one or more interfaces configured to connect to a network for communication, one or more processors, one or more memory elements coupled to the one or more processors, and instructions stored in the one or more memory elements. The method may be embodied as a computer program product including a non-transitory computer readable medium (e.g. one or more memory elements) and instructions stored in the computer readable medium, where the instructions are executable on one or more processors for performing the steps of the method. In some implementations, the instructions stored in the one or more memory elements may be executable on the one or more processors for operation as a control plane function, an SMF, an SMF plus an AMF, or other similar function(s).

Initially in FIG. 11, a dedicated QoS Flow may be established. In some implementations, this QoS Flow may be established with use of the techniques described in relation to FIG. 3 (i.e. the UPF-triggered QoS Flow creation procedure), where a plurality of packet filters associated with a plurality of flow tuples may be configured for packet classification for multiple packet flows of the QoS Flow with use of the techniques described in relation to FIGS. 5-9.

Beginning at a start block 1102 of FIG. 11, the control plane function node may receive, from the user plane function node, a message which indicates a request for removing a flow tuple from the existing QoS Flow (step 1104 of FIG. 11). This request may be received in response to the user plane function node identifying that a limit on a number of packet filters of a packet filter set of the existing QoS Flow has been reached, for example, when the user plane function node receives a "new" stream of traffic for a matching application on the existing QoS Flow. In some implementations, the packet filter that is selected for removal may be one that is identified to be inactive or least active relative to most or all other packet filters/flows. Alternatively, this request may be received in response to that a measured time period of traffic inactivity for a packet flow of the existing QoS Flow has been reached. In some implementations, the flow tuple is an IP tuple or 5-tuple for an IP flow. The message may indicate the flow tuple associated with a packet flow, the QFI of the existing QoS Flow, and a PDR ID of a PDR associated with a packet filter set of the existing QoS Flow. Based on receiving the message which indicates the request, the control plane function node may communicate a message which indicates a session modification command for receipt by the UE (step 1106 of FIG. 11), for removal of an uplink packet filter that is based on the flow tuple for the existing QoS Flow. The control plane function node may send, to the user plane function node, a message which indicates a response to the request for removing the flow tuple from the existing QoS Flow (step 1108 of FIG. 11).

Figure 12:
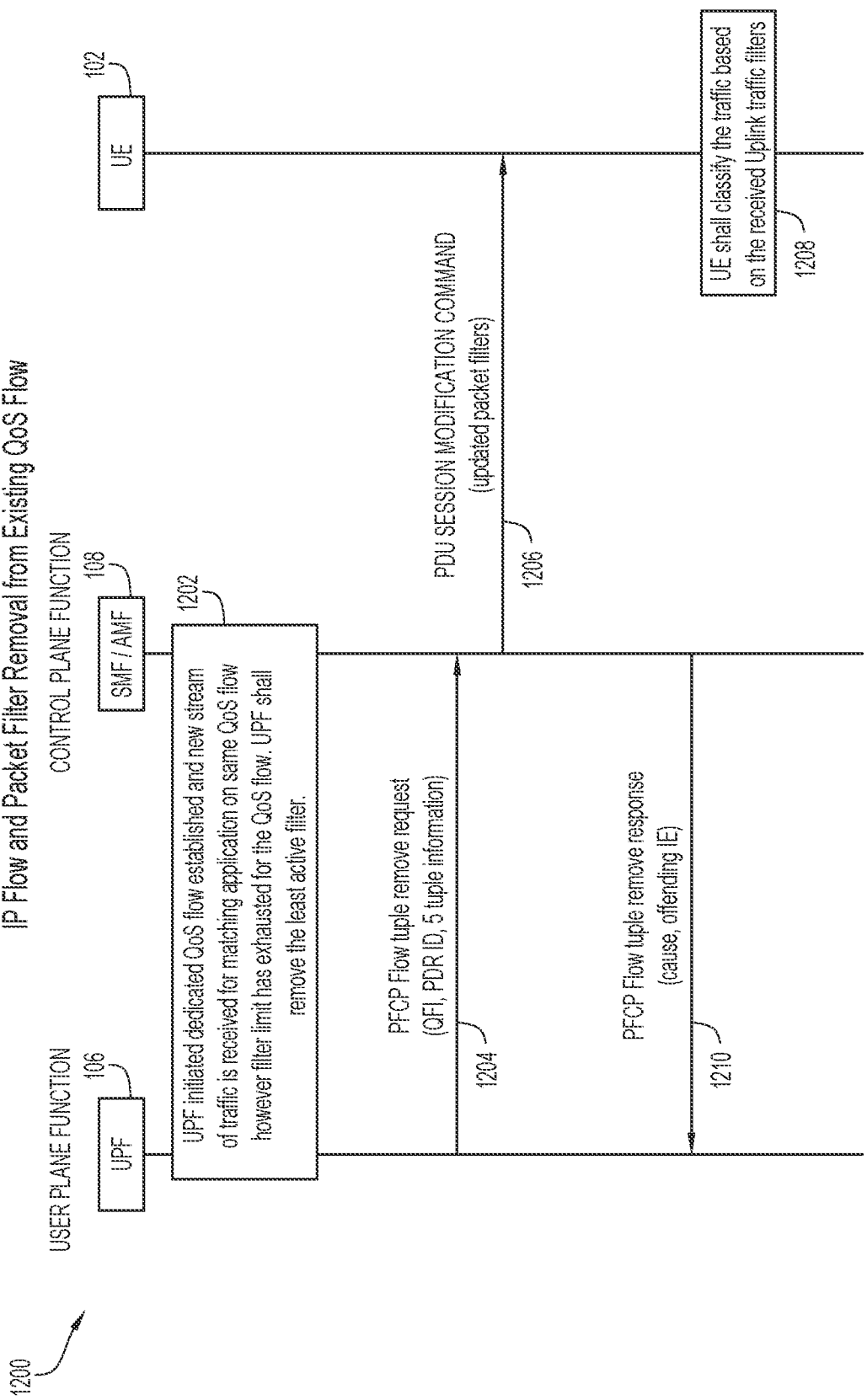
FIG. 12 is a call flow diagram for describing a call flow for packet flow management for existing QoS Flows in a mobile network, including a packet flow and filter removal from an existing QoS Flow according to some implementations of the present disclosure.

FIG. 12 is a call flow diagram 1200 for describing a call flow for packet flow management for existing QoS Flows in a mobile network. In particular, the call flow of FIG. 7 involves a packet flow and filter removal from an existing QoS Flow according to some implementations. The call flow of FIG. 12 may be in accord with the methods of FIGS. 10-11.

Initially in FIG. 12, a dedicated QoS Flow may be established at UPF 106. In some implementations, the dedicated QoS Flow may be established with use of the techniques described in relation to FIG. 3 (i.e. the UPF-triggered QoS Flow creation procedure), where a plurality of packet filters associated with a plurality of flow tuples may be configured for packet classification for multiple packet flows of the QoS Flow with use of the techniques described in relation to FIGS. 5-9.

Sometime during operation, UPF 106 may receive a new stream of traffic for a matching application on the QoS Flow, but identify that a limit on a number of packet filters of the packet filter set of the existing QoS Flow has been reached (step 1202 of FIG. 12). Alternatively, UPF 106 may identify that a measured time period of traffic inactivity for a packet flow of the existing QoS Flow has been reached (alternative step 1202 of FIG. 10). Based on the identifying, UPF 106 may remove a packet filter in the packet filter set of the existing QoS Flow that is based on a flow tuple and utilized for packet classification of the packet flow. In some implementations, the flow tuple is an IP tuple or 5-tuple for an IP flow. UPF 106 may send, to control plane function 108, a message which indicates a request for removing the flow tuple from the existing QoS Flow (step 1204 of FIG. 12). The message may be for triggering communication of a message which indicates a session modification command for receipt by UE 102 (step 1206 of FIG. 12), for removal of an uplink packet filter that is based on the flow tuple of the existing QoS Flow. The message may indicate the flow tuple associated with a packet flow, the QFI of the existing QoS Flow, and a PDR ID of a PDR associated with a packet filter set of the existing QoS Flow. In some implementations, the packet filter that is selected for removal may be one that is identified to be inactive or least active relative to most or all other packet filters/flows. In response to receipt of the message, UE 102 may configure the uplink packet filter for packet classification (step 1208 of FIG. 12). UPF 106 may receive, from control plane function 108, a message which indicates a response to the request for removing the flow tuple from the existing QoS Flow (step 1210 of FIG. 12).

In step 1206, where control plane function 108 has both an SMF and an AMF (e.g. for use in an enterprise private 5G network), control plane function 108 may communicate the message which indicates the session modification command by sending, towards a RAN (e.g. gNB) to UE 102, a message which indicates the session modification command for removing the uplink packet filter that is based on the flow tuple for the existing QoS Flow. Alternatively in step 1206, where control plane function 108 has an SMF (e.g. without AMF functionality) (e.g. for use in a public 5G network), control plane function 108 may communicate the message which indicates the session modification command by sending, towards an AMF and to UE 102, a message which indicates an N1N2 message transfer, and which includes the message which indicates the session modification command for adding the uplink packet filter that is based on the flow tuple for the existing QoS Flow. In some implementations, radio-side messaging that may be used to achieve the above processing may be similar to radio-side messaging 312 as described in relation to FIG. 3.

FIG. 13 is a table 1300 having a list of IEs which may be utilized in a message which indicates a request for removing a flow tuple to an existing QoS Flow for the methods described in relation to FIGS. 10-12 according to some implementations. As shown in table 1300, the IEs may include (at least some of) the QFI of the existing QoS Flow, the PDR ID of the PDR associated with the packet filter set, a protocol type, a source port, a destination port, a source address, and a destination address. In addition, FIG. 14 is a table 1400 having a list of IEs which may be utilized in a message which indicates a response to the request for removing a flow tuple from an existing QoS Flow for the methods described in relation to FIGS. 10-12 according to some implementations. As shown in table 1400, the IEs may include a cause and an offending IE (e.g. for indicating any issues in syntax, coding).

Accordingly, once a QoS Flow is established with use of the UPF-triggered QoS Flow creation procedure (e.g. FIG. 3), any new packet flows may be added upon receipt of new traffic associated with the QoS Flow in accordance with FIGS. 5-9; packet flows may be removed upon detection of an excess number of packet flows and/or flow inactivity timeouts in accordance with FIGS. 10-14. Eventually, the QoS Flow may be deleted with use of the UPF-triggered QoS Flow deletion procedure (e.g. FIG. 4).

Figure 15:
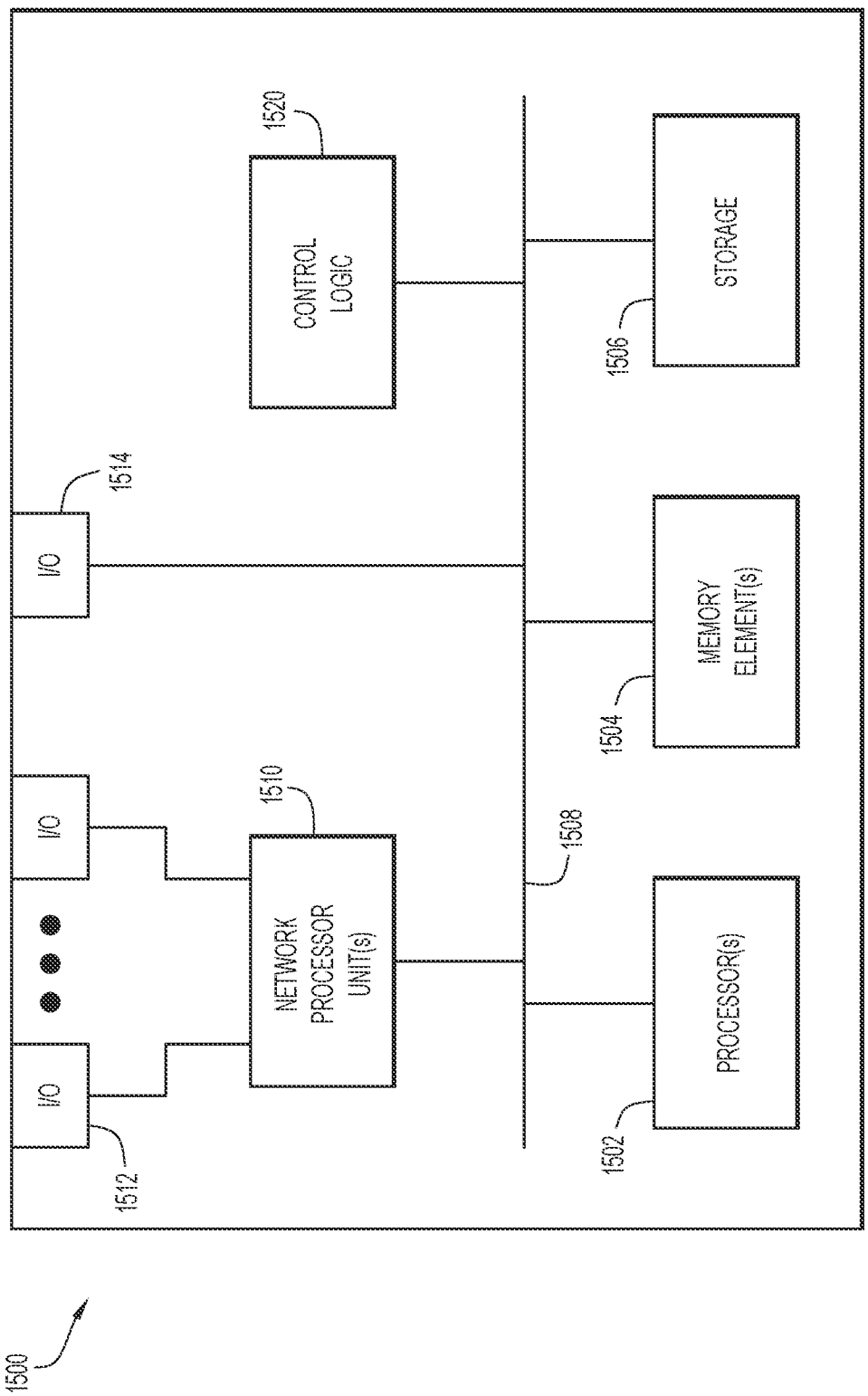
FIG. 15 illustrates a hardware block diagram of a computing device that may perform functions associated with operations discussed herein.

FIG. 15 illustrates a hardware block diagram of a computing device 1500 that may perform functions associated with operations discussed herein in connection with the techniques described in relation to the above figures, especially in relation to FIGS. 5-9 and 10-14, and including FIGS. 3-4. In various embodiments, a computing device, such as computing device 1500 or any combination of computing devices 1500, may be configured as any entity/entities as discussed for the techniques depicted in connection with the figures in order to perform operations of the various techniques discussed herein.

In at least one embodiment, the computing device 1500 may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with memory element(s) 1504 (or vice versa), or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, and/or any other I/O port(s) now known or hereafter developed. Thus, the network processor unit(s) 1510 and/or network I/O interface(s) 1512 may include suitable interfaces for receiving, transmitting, and/or otherwise communicating data and/or information in a network environment.

I/O interface(s) 1514 allow for input and output of data and/or information with other entities that may be connected to computer device 1500. For example, I/O interface(s) 1514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1520 can include instructions that, when executed, cause processor(s) 1502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1504 and/or storage 1506 can store data, software, code, instructions (e.g., processor instructions), logic, parameters, combinations thereof, and/or the like used for operations described herein. This includes memory element(s) 1504 and/or storage 1506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:
1. A method comprising:
at a user plane function node for use in a mobile network, receiving a packet for traffic associated with a user equipment (UE); and
identifying that a limit on a number of packet filters of a packet filter set of an existing Quality of Service (QOS) Flow has been reached or that a measured time period of inactivity for a packet flow of the existing QOS Flow has been reached, and based on the identifying:

removing a packet filter in the packet filter set of the existing QoS Flow that is based on a flow tuple of the packet and utilized for packet classification of the packet flow associated with the UE; and sending, to a control plane function node, a message which indicates a request for removing the flow tuple from the existing QoS Flow, wherein the request triggers the control plane function node to communicate a second message which indicates a session modification command for receipt by the UE that causes the UE to remove an uplink packet filter that is based on the flow tuple for the existing QoS Flow.

2. The method of claim 1, further comprising:

at the user plane function node, receiving, from the control plane function node, a message which indicates a response to the request for removing the flow tuple from the existing QoS Flow.

3. The method of claim 1, wherein the message which indicates the request for removing the flow tuple from the existing QoS Flow includes the flow tuple of the packet associated with the packet flow, a QoS Flow Identifier (QFI) of the existing QOS Flow, and a Packet Detection Rule Identifier (PDR ID) of a PDR associated with the packet filter set.

4. The method of claim 2, wherein the packet flow comprises a first packet flow, the flow tuple comprises a first flow tuple, the packet filter comprises a first packet filter, and the session modification command comprises a first session modification command, the method further comprising:

at the user plane function node, identifying that a second packet filter for a second packet associated with the UE is not found in the packet filter set of the existing QoS Flow, and based on the identifying:

configuring the second packet filter in the packet filter set of the existing QOS Flow based on a second flow tuple of the second packet, for packet classification of a second packet flow associated with the UE;

sending, to the control plane function node, a message which indicates a request for adding the second flow tuple to the existing QoS Flow, for triggering communication of wherein the request triggers the control plane function node to communicate a message which indicates a second session modification command for receipt by the UE that causes the UE to add a second uplink packet filter that is based on the second flow tuple of the existing QoS Flow; and receiving, from the control plane function node, a message which indicates a response to the request for adding the second flow tuple to the existing QoS Flow.

5. The method of claim 4, wherein the message which indicates the request for adding the second flow tuple to the existing QoS Flow includes the second flow tuple associated with the second packet flow, a QoS Flow Identifier (QFI) of the existing QoS Flow, and a Packet Detection Rule (PDR) ID of a PDR associated with the packet filter set.

6. The method of claim 1, further comprising:

at the user plane function node, identifying that packet classification for the packet is based on an access control list (ACL) or a Differentiated Services Control Point (DSCP), and based on the identifying:

refraining from sending, to the control plane function node, the message which indicates the request for removing the flow tuple from the existing QoS Flow.

7. The method of claim 1, wherein:

the control plane function node comprises a session management function (SMF) for use in the mobile network comprising a Third Generation Partnership Project (3GPP) Fifth Generation (5G) network, and the communication of the message which indicates the session modification command by the control plane function node further comprises:

sending, towards an access and mobility management function (AMF) and to the UE, a message which indicates an N1N2 message transfer, and which includes the message which indicates the session modification command for removing the uplink packet filter that is based on the flow tuple for the existing QoS Flow, or the control plane function node comprises the SMF and the AMF for use in the mobile network comprising an enterprise private 3GPP 5G network, and the communication of the message which indicates the session modification command by the control plane function node further comprises:

sending, towards a radio access network (RAN) to the UE, a message which indicates the session modification command for removing the uplink packet filter that is based on the flow tuple for the existing QoS Flow.

8. A method comprising:

at a control plane function node for use in a mobile network, receiving, from a user plane function node, a message which indicates a request for removing a flow tuple from an existing Quality of Service (QOS) Flow for traffic associated with a user equipment (UE), the message indicating the flow tuple of a detected packet associated with a packet flow and a QoS Flow Identifier (QFI) of the existing QoS Flow; and based on receiving the message which indicates the request for removing the flow tuple from the existing QoS Flow, communicating a second message which indicates a session modification command for receipt by the UE that causes the UE to remove an uplink packet filter that is based on the flow tuple for the existing QoS Flow.

9. The method of claim 8, further comprising:

at the control plane function node, sending, to the user plane function node, a message which indicates a response to the request for removing the flow tuple from the existing QoS Flow.

10. The method of claim 8, wherein the message which indicates the request for removing the flow tuple from the existing QoS Flow further indicates a Packet Detection Rule Identifier (PDR ID) of a PDR associated with a packet filter set of the existing QoS Flow.

11. The method of claim 8, wherein the packet flow comprises a first packet flow, the flow tuple comprises a first flow tuple, the uplink packet filter comprises a first uplink packet filter, and the session modification command comprises a first session modification command, the method further comprising:

at the control plane function node, receiving, from the user plane function node, a message which indicates a request for adding a second flow tuple to the existing QoS Flow, the message indicating the second flow tuple associated with a second packet flow and the QFI of the existing QoS Flow;

based on receiving the message which indicates the request for removing adding the second flow tuple to the existing QoS Flow, communicating a message which indicates a second session modification command for receipt by the UE that causes the UE to add a second uplink packet filter that is based on the second flow tuple for the existing QoS Flow; and sending, to the user plane function node, a message which indicates a response to the request for adding the second flow tuple to the existing QoS Flow.

12. The method of claim 11, wherein the message which indicates the request for adding the second flow tuple to the existing QoS Flow further includes a Packet Detection Rule (PDR) ID of a PDR associated with a packet filter set of the existing QoS Flow.

13. The method of claim 8, wherein the control plane function node comprises a session management function (SMF) for use in the mobile network comprising a Third Generation Partnership Project (3GPP) Fifth Generation (5G) network, and wherein communicating the message which indicates the session modification command for receipt by the UE further comprises:

sending, towards an access and mobility management function (AMF) and to the UE, a message which indicates an N1N2 message transfer, and which includes the message which indicates the session modification command for removing the uplink packet filter that is based on the flow tuple for the existing QOS Flow.

14. The method of claim 8, wherein the control plane function node comprises a session management function (SMF) and an access and mobility management function (AMF) for use in the mobile network comprising an enterprise private Third Generation Partnership Project (3GPP) Fifth Generation (5G) network, and wherein communicating the message which indicates the session modification command for receipt by the UE further comprises:

sending, towards a radio access network (RAN) to the UE, a message which indicates the session modification command for removing the uplink packet filter that is based on the flow tuple for the existing QoS Flow.

15. A network node comprising:

one or more interfaces to connect in a mobile network;
one or more processors; and
one or more memory elements for storing instructions executable on the one or more processors for operation as a control plane function of the mobile network, the operation including:

receiving, from a user plane function node, a message which indicates a request for removing a flow tuple from an existing Quality of Service (QOS) Flow for traffic associated with a user equipment (UE), the message indicating the flow tuple of a detected packet associated with a packet flow and a QoS Flow Identifier (QFI) of the existing QoS Flow;

based on receiving the message which indicates the request for removing the flow tuple from the existing QoS Flow, communicating a second message which indicates a session modification command for receipt by the UE that causes the UE to remove an uplink packet filter that is based on the flow tuple for the existing QoS Flow; and sending, to the user plane function node, a third message which indicates a response to the request for removing the flow tuple from the existing QoS Flow.

16. The network node of claim 15, wherein the message which indicates the request for removing the flow tuple from the existing QoS Flow further indicates a Packet Detection Rule Identifier (PDR ID) of a PDR associated with a packet filter set of the existing QoS Flow.

17. The network node of claim 15, wherein the packet flow comprises a first packet flow, the flow tuple comprises a first flow tuple, the uplink packet filter comprises a first uplink packet filter, and the session modification command comprises a first session modification command, and wherein the instructions are executable on the one or more processors for operation as the control plane function further including:

receiving, from the user plane function node, a message which indicates a request for adding a second flow tuple to the existing QoS Flow, the message indicating the second flow tuple associated with a second packet flow and the QFI of the existing QoS Flow;

based on receiving the message which indicates the request for adding the second flow tuple to the existing QoS Flow, communicating a message which indicates a second session modification command for receipt by the UE that causes the UE to add a second uplink packet filter that is based on the second flow tuple for the existing QoS Flow; and sending, to the user plane function node, a message which indicates a response to the request for adding the second flow tuple to the existing QoS Flow.

18. The network node of claim 17, wherein the message which indicates the request for adding the second flow tuple to the existing QoS Flow further includes a Packet Detection Rule (PDR) ID of a PDR associated with a packet filter set of the existing QoS Flow.

19. The network node of claim 15, wherein the control plane function comprises a session management function (SMF) for use in the mobile network comprising a Third Generation Partnership Project (3GPP) Fifth Generation (5G) network, and wherein the instructions are executable on the one or more processors for operation as the control plane function for communicating the message which indicates the session modification command for receipt by the UE by:

sending, towards an access and mobility management function (AMF) and to the UE, a message which indicates an N1N2 message transfer, and which includes the message which indicates the session modification command for removing the uplink packet filter that is based on the flow tuple for the existing QoS Flow.

20. The network node of claim 15, wherein the control plane function comprises a session management function (SMF) and an access and mobility management function (AMF) for use in the mobile network comprising an enterprise private Third Generation Partnership Project (3GPP) Fifth Generation (5G) network, and wherein the instructions are executable on the one or more processors for operation as the control plane function for communicating the message which indicates the session modification command for receipt by the UE by:

sending, towards a radio access network (RAN) to the UE, the message which indicates the session modification command for removing the uplink packet filter that is based on the flow tuple for the existing QoS Flow.

* * * * *